United States Patent [19]

Gallagher et al.

[11] Patent Number: 4,935,096

[45] Date of Patent: Jun. 19, 1990

[54] PROCESS FOR THE DEINKING OF CELLULOSIC MATERIALS

[75] Inventors: Francis B. Gallagher, Stanhope, N.J.; Gordon C. Johnson, Wakefield, R.I.

[73] Assignee: Garden State Paper Company, Inc., Saddle Brook, N.J.

[21] Appl. No.: 280,371

[22] Filed: Dec. 6, 1988

[51] Int. Cl.$^5$ ................................. D21C 5/02
[52] U.S. Cl. ........................ 162/5; 162/158; 162/DIG. 3
[58] Field of Search ...................... 162/5, DIG. 3, 158

[56] References Cited

U.S. PATENT DOCUMENTS

| | | | |
|---|---|---|---|
| 2,487,899 | 11/1949 | Sherman | 162/158 |
| 2,753,309 | 7/1956 | Figdor | 162/5 |
| 3,072,521 | 1/1963 | Samuelson et al. | 162/5 |
| 3,377,234 | 4/1968 | Illingworth | 162/5 |
| 3,446,696 | 5/1969 | Illingworth | 162/158 |
| 3,808,089 | 4/1974 | Von Koeppen et al. | 162/5 |
| 4,264,412 | 4/1981 | Hasler et al. | 162/5 |
| 4,360,439 | 11/1982 | Calmanti et al. | 162/5 |
| 4,529,447 | 7/1985 | Okada et al. | 162/158 |

FOREIGN PATENT DOCUMENTS

| | | | |
|---|---|---|---|
| 59-150191 | 8/1984 | Japan | 162/5 |
| 991367 | 5/1965 | United Kingdom | 162/5 |

*Primary Examiner*—Wilbur Bascomb
*Attorney, Agent, or Firm*—Morgan & Finnegan

[57] ABSTRACT

An improved method for deinking waste printed, cellulosic fibrous materials which includes the addition of ionic surfactants either alone or in combination with non-ionic surfactants. The ionic surfactants are anionic, cationic or amphoteric.

17 Claims, No Drawings

PROCESS FOR THE DEINKING OF CELLULOSIC MATERIALS

BACKGROUND OF THE INVENTION

This invention relates to the deinking of waste printed paper which may be used to make newsprint, magazine or book stock.

Processes for deinking cellulosic materials have been described in U.S. Pat. Nos. 3,392,083 and 3,932,206. Typically, a process includes dispersing, in a large agitated reactor (pulper), cellulosic material, i.e. waste paper, in water containing a non-ionic surfactant and other chemical adjuncts. The resulting dispersion or pulp slurry is washed and diluted with additional water which is introduced using counter current water flow to separate ink from the slurry. The pulp is drained and then used to form paper. It is common to add other constituents during the steps of pulping, washing or just prior to paper formation. These constituents may include chemicals for pH adjustment, inorganic phosphates and dispersing agents, talc to reduce the redeposition of materials previously separated from the pulp, defoaming agents, dyes, bleaching agents, flocculating agents, and sizing agents which impart water resistance to the final paper. Other materials may be used to satisfy specific processing or paper property needs.

Non-ionic surfactants, which typically contain a polyglycol (ethylene oxide) portion, are conventionally used when washing processes are utilized to deink printed paper. They not only aid in the removal of inks by emulsifying and dispersing the ink material, but additionally they may enhance dispersion of the fiber in the water. However, some residual amounts of nonionic surfactant remain in the finished, reconstituted paper, which results in the rapid rewetting of the paper and a reduction of paper strength. When sizing chemicals are used, the residual nonionic surfactant negates the desired water resistance (sizing).

In particular, the residual surfactant is undesirable when the reconstituted paper is used for printing, i.e. off-set printing, where it is desirable to have enhanced water resistance so that the paper is not instantly wetted. Such water resistance reduces the amount of paper web breaks which occur on the printing presses and may impart improved print appearance.

To overcome the deleterious effects of the residual non-ionic surfactant, increasingly larger quantities of sizing chemicals have been used. This has not only proven undesirable economically, but additionally has resulted in finished paper having less favorable brightness, strength and other physical properties, as well as paper machine processing difficulties. Moreover, introduction of a greater amount of sizing agent has not always been effective in imparting the desired water resistance and is additionally deleterious to strength.

SUMMARY OF THE INVENTION

It is an object of this invention to provide methods for deinking cellulosic materials to produce a pulp that may be readily and economically handled on conventional paper making machines.

It is a further object of this invention to provide methods for deinking cellulosic materials to produce paper having improved strength.

It is an even further object of this invention to provide methods for producing paper having improved water resistance when treated with sizing agents, while maintaining and enhancing the properties of the finished paper and reducing processing difficulties.

DETAILED DESCRIPTION OF THE INVENTION

The present invention reduces the aforementioned difficulties relating to strength and water resistance in reconstituted paper by the addition of ionic surfactants, either alone or in combination with non-ionic surfactants. The use of ionic surfactants for deinking results in significantly improved water resistance when the deinked pulp is treated with sizing chemicals and formed into paper, while minimizing strength loss and maintaining acceptable brightness of the finished paper. Moreover, these improvements can occur without any negative effect on paper machine or printing operations.

Ionic surfactants used in the present invention may be anionic, cationic or amphoteric. These surfactants may be added during the initial pulping step of the deinking process and/or during subsequent washing steps. Moreover, the invention covers addition of the ionic surfactants either alone or in combination with non-ionic surfactants. When non-ionic surfactants are introduced during the initial pulping step, ionic surfactants may be added at the same time or subsequently during the washing steps.

Anionic surfactants which are suitable for this invention typically have a hydrophobe portion which is an alkyl benzene or a hydrocarbon. The length of the alkyl group attached to benzene ring is not critical, though preferably contains 8–14 carbon atoms. The hydrocarbon group typically contains 8–20 carbon atoms. The hydrophile portion of the anionic surfactant may be a carboxylate, sulfate, sulfonate, ether sulfate, sulfosuccinate or phosphate group. While many anionic surfactants are suitable for the purpose of this invention, it is preferred that the following anionic surfactants be used; sodium alkyl benzene sulfonates such as sodium dodecyl or tridecyl benzene sulfonate, sodium alcohol ether sulfate such as sodium laureth-3 sulfate, sodium alcohol sulfate such as sodium coco sulfate, sodium alkyl sulfosuccinate or sodium dialkyl sulfosuccinates such as sodium bis (tridecyl) sulfosuccinate, or sodium or potassium fatty acids such as sodium stearate or sodium tallowate. A most preferred embodiment of this invention using anionic surfactants is the use of sodium dodecyl benzene sulfonate.

Cationic surfactants of the present invention typically have one, two, or three alkyl groups with each alkyl group containing C12–C20, and preferably C12–C18. The surfactant may possess a nitrogen atom which has been quaternized. Quaternary groups include alkyl, imadazolinium, benzyl or dialkoxy alkyl groups. The counter ion may be a chloride or methyl sulfate. Preferred cationic surfactants are mono, di or tri alkyl quaternaries such as dihydrogenated tallow dimethyl ammonium chloride, mono and di alkyl benzyl quaternaries, mono and di alkyl imidazolinium quaternaries, and dialkyl ammonium methyl sulfates such as N,N-2-Ethylpalmitoyl-N-2-Hydroxethyl-N-Methyl sulfate.

Amphoteric surfactants suitable for the present are water dispersible and include but are not limited to a carboxylated imidazoline such as cocoamphoglycinate and aminopropionates such as disodium lauriminodipropionate.

In accordance with the present invention, when using combinations of non-ionic surfactants and ionic surfactants the ratio of ionic surfactant to non-ionic surfactant is from 100:1 to 1:100, and preferably from 1:50 to 1:3.

The non-ionic surfactants should have an average HLB value of about 10 to 18, preferably from 12 to 16, with a hydrophobe chain length of from 8 to 36 carbons, and preferably from 8 to 16 carbons. HLB is defined as the average weight percent of polyethylene oxide in the surfactant divided by 5. Suitable non-ionic surfactants which may be used in combination with ionic surfactants include alkyl phenol ethoxylates, ethoxylates of alcohols or fatty acids, and mixed ethylene/propylene oxide adducts. Two or more non-ionic surfactants can be used provided the desired HLB range is maintained based on the weighted average of the HLB's of the components.

When the surfactants of the present invention are used in conjunction with sizing chemicals, the size chemicals preferably used are alkyl ketene dimer or alkyl succinic anhydride sizing agents. Other sizing agents may be suitable. Alkyl ketene dimer or alkyl succinic anhydride sizing agents may be combined before introduction into the pulp, with starches, polymers or emulsifiers, which aid in dispersion, emulsification and retention of the sizing agents, and which are typically used in the industry.

If desired, additional constituents such as defoamers may be used in the process of the invention to satisfy particular processing or paper property needs. Suitable defoamers may include ethoxylate/propoxylate surfactants, and/or derivatives of kerosene, fatty amides and silicones. Cars must be taken in selecting defoamers so as to avoid impairment of sizing.

The invention is further illustrated by the following examples:

EXAMPLE 1

Each of the surfactants listed in Table 1 were tested for their effect on sizing and brightness by using the following procedure:

1. 1930 grams of water was added to a 2 liter laboratory pulper and agitated at 90-100 F. The test surfactant was then added to the agitated water, in an amount equal to 0.95% by weight of air dried newspaper. The pH was adjusted 8.5-9.5 with alkali. 70 grams of shredded printed newspaper was added and then repulped in a laboratory pulper for 20 minutes.
2. Twenty grams of pulp (dry basis) from Step 1, was diluted to 1.5% consistency with warm water (about 90% F.). This slurry was mixed gently by hand and drained through a Tyler 150 mesh screen. The washing procedure was repeated three times.
3. Six grams (dry basis) of the washed pulp was diluted to 450 grams with water, the pH was adjusted to 6.5 with sulfuric acid, and a pulp pad was then formed using a filter paper and Buchner suction funnel. The pulp pad was removed from the funnel and placed between blotter paper and pressed in a platen press for 15 seconds. The pad was then dried on a sheet dryer for 20 minutes at 180° F. The brightness of the paper samples was measured according to ISO standard 3688 (1977).
4. For measuring the degree of sizing (water resistance), 14 grams of pulp (dry basis) from step 2 was diluted with water to 3.5% consistency and mixed with 0.4% cationic starch on the weight of fiber. Using 2 grams (dry basis) of this diluted slurry, 0.006 g of alkyl ketene dimer available from Hercules, Inc. as Hercon 48 [0.295% by weight of dry pulp]. Handsheets were made using a TAPPI sheet mold. The handsheets were couched (pressed) between two blotters and then pressed in a TAPPI press between blotters, changing the blotters and then pressed a second time, so the moisture content was approximately 60%. The paper was then dried between dryer fabric in a Carver press between heated plattens at 2000 psi and 130° C. Samples were conditioned for 16-24 hours at 50% RH/73° F. before testing. The degree of sizing for each sample was tested by measuring the amount of time in seconds for a 20 microliter drop of water to be absorbed by the sample.

In several of the examples where ionic surfactants were utilized, a small amount of ethoxylated/propoxylated surfactants was added merely to control foaming, but was not necessary for the purposes of this invention.

As shown in Table 1, the use of anionic surfactants greatly enhanced the sizing while maintaining the desired brightness of the paper.

EXAMPLE 2

Surfactant mixtures consisting of 27% anionic surfactant, (Biosoft S-100 neutralized with sodium hydroxide) 3% of an alcohol ethoxylate/propoxylate (HLB of about 10) (Plurafac RA-20 from BASF) and 70% primary alcohol ethoxylate (HLB of about 14.4) (Neodol 45-13, from Shell) were tested using the procedures described in Example 1. The results as illustrated in Table 2 demonstrate that the anionic surfactant enhances the sizing of the finished paper while maintaining paper brightness.

EXAMPLE 3

The 27% anionic surfactant of Example 2 was replaced with cationic surfactant and the surfactant mixtures were tested using procedures described in Example 1. As shown in Table 3, the presence of the cationic surfactant enhanced sizing while maintaining paper brightness.

EXAMPLE 4

The 27% anionic surfactant of Example 2 was replaced with amphoteric surfactant and the surfactant mixtures were tested using procedures described in Example 1. As shown in Table 4, the presence of the amphoteric surfactant resulted in superior sizing while maintaining paper brightness.

EXAMPLE 5

In a continuous commercial deinking operation, a primary alcohol ethoxylate non-ionic surfactant with an HLB of 14.2 (TERGITOL 24L98N, Union Carbide) was added to the pulpers at 15-17 lb/ton. An alkyl succinic anhydride (ASA) sizing agent dispersed with a cationic polymer at 7.4 lb/ton was added to the headbox fan pump. Under these conditions the size level as measured by the standard water drop test is typically 100-200 seconds. The primary alcohol surfactant was then replaced at the same addition rate with a mixed surfactant system consisting of:

22.00% (active basis) Sodium salt of dodecyl benzene sulfonate (Biosoft D-40 from Stepan Co., Northfield, IL.);

12.5% (active basis) Primary alcohol ethoxylate (HLB=8), (TERGITOL 26L3 surfactant from Union Carbide, Danbury, CT);

63.25% (active basis) Primary alcohol ethoxylate (HLB=14.2) (NEODOL 45-13 from Shell, Houston, TX);

2.25% (active basis %) Alcohol ethoxylate/propoxylate (HLB=10) (PLURAFAC RA-20 from BASF, Parsippany, NJ).

As shown in Table 5, upon the addition of the mixed anionic/nonionic surfactant system, the size values increased and the desired brightness values were maintained. This example illustrates that a mixed anionic/nonionic system is more effective than a strictly nonionic system in that less ASA sizing chemical is required to maintain or exceed the size normally obtained when only a nonionic surfactant is used.

EXAMPLE 6

In a continuous commercial deinking operation, a primary alcohol ethoxylate non-ionic surfactant with an HLB of 14.4 (NEODOL 45-13) was added to the pulpers at 19 lb/ton. An alkyl ketene dimer sizing agent was added to the suction side of the headbox fan pump. In this test, 1 lb/ton of sodium dodecyl benzene sulfonate was added to the third washer of a three stage counter current flow washer system. As shown in Table 6, the sizing values increased and the desired brightness values were maintained when the anionic surfactant was added during the washing step. This example illustrates that the anionic surfactant can be introduced during either the pulping or washing steps, and mixed anionic/non-ionic surfactant systems interfere less with size chemical effectiveness than nonionic surfactants alone.

had on strength in comparison to non-ionic surfactants. (Table 7) Measurements were taken for Sterox DJ, Neodol 45-13, and Neodol 45-13 plus Biosoft D-40. Table 8 reflects the comparison between strength values for Neodol 45-13 (with and without Biosoft D-40) and Sterox DJ. The nonionic surfactants (Sterox DJ and Neodol 45-13) were introduced at the pulpers at the 15–17 lb/ton level. When the anionic surfactant (Biosoft D-40) was used, it was introduced to the washers at 1 lb/ton.

| KEY FOR TABLES 1-7 |
|---|
| Sod. LAS = Sodium dodecyl benzene sulfonate - Bisoft S-100 + NaOH; Stepan, Northfield, IL; Alternate LAS = Biosoft D-40 water solution used in plant; S-100 at 100%, neutral in lab |
| Sod. AES = Sodium alcohol 3 mole ether sulfate - Steol CS-460, Stepan |
| Sod. AS = Sodium alcohol sulfate - Stepanol WAC - Stepan |
| R-EOPO = Alcohol poly (ethoxylate/propoxylate) Plurafac RA-20, BASF, Parsippany, NJ |
| HLB = Hydrophobic-Liphohilic Balance |
| HLB = Weight % ethylene oxide/5 |
| STC = Sodium tallow carboxylate - Ivory Snow Flakes, from Procter & Gamble, Cincinnati, Ohio |
| SBTS = Sodium bis (tridecyl) sulfosuccinate (Emcol 4600, from Witco Chemical, NY, NY) |
| PAE = Primary alcohol ethoxylate |
| PAE for Tables 2-4 = Neodol 45-13 |
| DPAMS = N,N-2-Ethylpalmitoyl-N-2-Hydroxyethyl-N-Methyl Ammonium Methyl sulfate - Stepanquat 6585, Stepan, Northfield, Illinois |
| DTDMAC = Dihydrogentated tallow dimethyl ammonium chloride - Adogen 442, Sherex, Dublin, Ohio |
| DSLDP = Disodium lauriminodipropionate MIRATAINE H2C from Miranol, Dayton, Ohio |
| CAPG = Cocoamphoglycinate MIRANOL CM from Miranol, Dayton, Ohio |

TABLE 1

| SURFACTANT | | SIZE TEST (SEC) | ISO BRIGHTNESS |
|---|---|---|---|
| None | | 555 | 48.1 Ink specks |
| Alkyl phenol ethoxylate (Sterox DJ, from Monsanto (St. Louis Mo.) | HLB 12.6 | 45 | 55.5 No ink speck |
| Primary alcohol ethoxylate (Neodol 25-9) | HLB 13.3 | 156 | 54.9 |
| Primary alcohol ethoxylate (Tergitol 24L92) | HLB 14.0 | 27 | 53.2 |
| Primary alcohol ethoxylate (Tergitol 24L98N) | HLB 14.2 | 40 | 53.4 |
| Primary alcohol ethoxylate (Neodol 45-13) | HLB 14.4 | 92 | 54.2 |
| Primary alcohol ethoxylate (Neodol 45-13) | " | 25 | 54.1 |
| Primary alcohol ethoxylate (Neodol 45-13) | " | 170 | 54.9 |
| Sodium dodecyl benzene sulfonate (Bisoft S-100/NaOH) | | 826 | 53.4 |
| 90% Sod. LAS/10% R-EOPO (Bisoft S-100/NaOH) | | 950 | 51.9 |
| 90% Sod. AES/10% R-EOPO (Steol CS-460) | | 4237 | 53.2 |
| 90% Sod. AS/10% R-EOPO (Stepanol WAC) | | 726 | 53.1 |

EXAMPLE 7

Burst, Tensile, Tensile Energy Absorption and IGT were measured to determine the effect ionic surfactants

TABLE 2

| % ADDED | SURFACTANT | | ISO BRIGHTNESS | SIZE TEST (SEC) |
|---|---|---|---|---|
| .65% | PAE | | 53.4 | 92 |
| .95 | PAE | | 54.4 | 96 Ave 3 tests |
| .95 | 27% LAS/3% R-EOPO/70% PAE | | 53.6 | 103 Ave 3 tests |
| .95 | 27% AES/3% R-EOPO/70% PAE | | 55.6 | 124 |

TABLE 2-continued

| % ADDED | SURFACTANT | ISO BRIGHTNESS | SIZE TEST (SEC) |
|---|---|---|---|
| .95 | 27% STC/3% R-EOPO/70% PAE | 54.6 | 154 |
| .95 | 27% SBTS/3% R-EOPO/70% PAE | 55.8 | 268 |

TABLE 3

| SURFACTANT | ISO BRIGHTNESS | SIZE TEST (SEC) | |
|---|---|---|---|
| PAE | 54.4 | 96 | Ave 3 tests |
| 27% DPAMS/3% R-EOPO/70% PAE | 54.2 | 206 | |
| 27% DTDMAC/3% R-EOPO/70% PAE | 54.9 | 581 | |

TABLE 4

| SURFACTANT | ISO BRIGHTNESS | SIZE TEST (SEC) | |
|---|---|---|---|
| PAE | 54.4 | 96 | Ave 3 tests |
| 27% DSLDP/3% R-EOPO/70% PAE | 54.4 | 151 | |
| 27% CAPG/3% R-EOPO/70% PAE | 55.9 | 228 | |

TABLE 5

| SIZE TEST (SEC) | ISO BRIGHTNESS | COMMENT |
|---|---|---|
| <10 | 58.3 | Samples 2 hr. before test (No size added) |
| 135 | 58.6 | Start of ASA size at 7.4 lb/T |
| 219 | 59.3 | ASA size at 6.9 lb/T |
| 227 | 59.0 | Reduced size to 6.5 lb/T |
| 280 | 58.5 | Reduced size to 6.2 lb/T |
| 205 | 58.0 | Size at 5.8 lb/T |
| 244 | 58.2 | Size at 5.5 lb/T |
| 249 | 58.6 | Size at 5.5 lb/T End of size addition |

Note 1:
7.4 lb/T ASA gives typical size of 100-200 seconds under similar commercial conditions when using only nonionic surfactant
Note 2:
Mixed anionic/nonionic surfactant present for all values shown in Table 5.

TABLE 6

| Size Test (Sec) | ISO BRIGHTNESS | COMMENT |
|---|---|---|
| <10 | 58.2 | Sample 30 min. before test |
| 104 | 58.1 | Start of 5 lb/T AKD size |
| 218 | 57.8 | 5 lb/T AKD size |
| 382 | 58.4 | " |
| 245 | 58.8 | " |
| 146 | 58.1 | Start of 7.5 lb/T AKD size |
| 137 | 58.5 | 7.5 lb/T AKD size |
| 232 | 58.6 | " |
| 537 | 57.8 | " |
| 477 | 57.8 | " |

Note 1:
Typical size values are 60-100 seconds when 5 lb/T AKD used and only nonionic surfactant present.
Note 2:
Anionic/nonionic surfactants present for all values shown in Table 6.

TABLE 7

| Newsprint 3000 square foot basis weight | #1 Paper Machine | | | #2 Paper Machine | | |
|---|---|---|---|---|---|---|
| | Sterox DJ | Neodol 45-13 | Neodol 45-13 + Biosoft D-40 | Sterox DJ | Neodol 45-13 | Neodol 45-13 + Biosoft D-40 |
| | BURST (psi) | | | | | |
| 30# Unsized | 8.85 | 9.68 | 9.92 | 8.15 | 8.71 | 9.38 |
| 30# Sized | 9.26 | 8.96 | 9.39 | 7.84 | 9.17 | 8.65 |
| 28# Unsized | — | — | — | 7.30 | 7.98 | 8.47 |
| | Tensile (Kg.) | | | | | |
| 30# Unsized | 3.08 | 3.44 | 3.35 | 3.18 | 3.30 | 3.84 |
| 30# Sized | 2.87 | 3.31 | 3.22 | 3.10 | 3.44 | 3.56 |
| 28# Unsized | — | — | — | 3.11 | 3.44 | 3.56 |
| | TENSILE ENERGY ABSORPTION (TEA) (gram-inches/10) | | | | | |
| 30# Unsized | 7.9 | 9.5 | 8.7 | 6.7 | 7.6 | 10.2 |
| 30# Sized | 7.4 | 8.5 | 8.3 | 6.6 | 8.3 | 8.6 |
| 28# Unsized | — | — | — | 7.4 | 8.5 | 8.9 |
| | IGT** | | | | | |
| 30# Unsized | 7.0 | 5.4 | 4.0 | 3.5 | 3.6 | 3.5 |
| 30# Sized | 5.8 | 6.1 | 4.4 | 6.8 | 3.6 | 3.3 |
| 28# Unsized | — | — | — | 5.2 | 3.2 | 3.5 |

Test procedures:
Burst = TAPPI Standard Testing Method T-403
Tensile = TAPPI Standard Testing Method T-494
TEA = Modified TAPPI T-494
IGT = Modified TAPPI UM591
**The values for IGT are an average of the ratings for the top and bottom sides of the samples tested. Lower values indicated better results.

TABLE 8

| | %  INCREASE OVER Sterox DJ | | | | | |
|---|---|---|---|---|---|---|
| | #1 Paper Machine | | | #2 Paper Machine | | |
| Newsprint 3000 square foot basis weight | Sterox DJ | Neodol 45-13 | Neodol 45-13 + Biosoft D-40* | Sterox DJ | Neodol 45-13 | Neodol 45-13 + Biosoft D-40 |
| Burst | | | | | | |
| 30# Unsized | — | 9.4 | 12.1 | — | 6.0 | 15.1 |
| 30# Sized | — | −3.2 | 1.4 | — | 17.0 | 10.3 |
| 28# Unsized | — | — | — | — | 9.3 | 16.0 |
| Tensile | | | | | | |
| 30# Unsized | — | 11.7 | 8.4 | — | 3.8 | 20.8 |
| 30# Sized | — | 15.3 | 12.2 | — | 13.2 | 11.6 |
| 28# Unsized | — | — | — | — | 10.6 | 14.5 |
| TEA | | | | | | |
| 30# Unsized | — | 20.3 | 10.1 | — | 13.4 | 52.2 |
| 30# Sized | — | 14.9 | 12.2 | — | 25.8 | 30.3 |
| 28# Unsized | — | — | — | — | 14.9 | 20.3 |
| IGT | | | | | | |
| 30# Unsized | — | 22.9 | 42.9 | — | −2.9 | 0.0 |
| 30# Sized | — | −5.0 | 24.1 | — | 47.0 | 51.5 |
| 28# Unsized | — | — | — | — | 38.5 | 32.7 |

*Biosoft D-40 added to washers at 1 lb/T

While the invention has been described in detail and with reference to specific embodiments thereof, it will be apparent that various changes and modifications can be made therein without departing from the spirit and scope thereof.

What is claimed is:

1. An improved method of deinking cellulosic materials which comprises:
   dispersing a cellulosic material in water to form a pulp slurry;
   pulping the dispersed cellulosic material to remove ink therefrom;
   washing the pulp slurry to dispose of the removed ink;
   wherein an ionic surfactant is added during any of the dispersing, pulping or washing steps, and a sizing agent is added during or subsequent to any of the dispersing, pulping or washing steps.

2. A method as recited in claim 1, wherein the pulp slurry is dried and then used to form reconstituted paper.

3. A method as recited in claim 1 wherein the added ionic surfactant is combined with a non-ionic surfactant.

4. A method as recited in claim 1 wherein the added ionic surfactant is an anionic surfactant.

5. A method as recited in claim 1 wherein the added ionic surfactant is a cationic surfactant.

6. A method as recited in claim 1 wherein the added ionic surfactant is an amphoteric surfactant.

7. A method as recited in claim 1 wherein the ionic surfactant is added during the dispersing of the cellulosic material.

8. A method as recited in claim 1 wherein the ionic surfactant is added during the pulping step.

9. A method as recited in claim 1 wherein the ionic surfactant is added during the washing step.

10. A method as recited in claim 3 wherein the ratio of ionic surfactant to non-ionic surfactant is from about 100:1 to about 1:100.

11. A method as recited in claim 10 wherein the ratio of ionic surfactant to non-ionic surfactant is from 1:50 to 1:3.

12. A method as recited in claim 1 wherein the amount of surfactant added is from about 0.3 to about 2% by weight of cellulosic material.

13. A method as recited in claim 4 wherein the anionic surfactant is sodium dodecyl benzene sulfonate, sodium laureth-3 sulfate, sodium coco sulfate, sodium bis (tridecyl) sulfosuccinate, sodium stearate, sodium tallowate, or mixtures thereof.

14. A method as recited in claim 5 wherein the cationic surfactant is dihydrogenated tallow dimethyl ammonium chloride, N,N-2-ethylpalmitoyl-N-2-Hydroxyethyl-N-methyl ammonium methylsulfate, or mixtures thereof.

15. A method as recited in claim 6 wherein the amphoteric surfactant is cocoamphoglycinate, or disodium lauriminodipropionate.

16. A method as recited in claim 1 wherein the sizing agent is an alkyl ketene dimer or an alkyl succinic anhydride.

17. An improved method of deinking cellulosic materials which comprises:
   dispersing a cellulosic material in water to form a pulp slurry;
   pulping the dispersed cellulosic material to remove ink therefrom;
   washing the pulp slurry to dispose of the removed ink;
   wherein an ionic surfactant is added during any of the dispersing, pulping or washing steps, and a sizing agent is added subsequent to the washing step.

* * * * *

UNITED STATES PATENT AND TRADEMARK OFFICE
CERTIFICATE OF CORRECTION

PATENT NO. : 4,935,096

DATED : June 19, 1990

INVENTOR(S) : Francis Bernard Gallagher & Gordon C. Johnson

It is certified that error appears in the above-identified patent and that said Letters Patent is hereby corrected as shown below:

Column 3, line 31, change "Cars" to --Care--.

Column 5, line 5, change "14.2" to --14.4--.

Column 6, Table 1, change "No ink speck" to --no ink specks--.

Signed and Sealed this

Nineteenth Day of May, 1992

Attest:

DOUGLAS B. COMER

Attesting Officer

Acting Commissioner of Patents and Trademarks